United States Patent
Bergter et al.

(10) Patent No.: US 10,684,221 B2
(45) Date of Patent: Jun. 16, 2020

(54) LIGHT MICROSCOPE AND METHOD FOR DETERMINING A WAVELENGTH-DEPENDENT REFRACTIVE INDEX OF A SAMPLE MEDIUM

(71) Applicant: Carl Zeiss Microscopy GmbH, Jena (DE)

(72) Inventors: Annette Bergter, Jena (DE); Helmut Lippert, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 80 days.

(21) Appl. No.: 15/769,286

(22) PCT Filed: Oct. 11, 2016

(86) PCT No.: PCT/EP2016/074313
§ 371 (c)(1),
(2) Date: Apr. 18, 2018

(87) PCT Pub. No.: WO2017/080737
PCT Pub. Date: May 18, 2017

(65) Prior Publication Data
US 2018/0306714 A1 Oct. 25, 2018

(30) Foreign Application Priority Data

Nov. 9, 2015 (DE) .......................... 10 2015 119 258

(51) Int. Cl.
*G01N 21/41* (2006.01)
*G01N 21/27* (2006.01)
(Continued)

(52) U.S. Cl.
CPC ....... *G01N 21/4133* (2013.01); *G01N 21/274* (2013.01); *G02B 21/0076* (2013.01);
(Continued)

(58) Field of Classification Search
CPC .................................................. G01N 21/4133
(Continued)

(56) References Cited

U.S. PATENT DOCUMENTS

| 2002/0003204 A1* | 1/2002 | Engelhardt | ........ | G02B 21/0032 250/216 |
| 2004/0197927 A1 | 10/2004 | Jeng et al. | | |

(Continued)

FOREIGN PATENT DOCUMENTS

| CN | 101082577 A | 12/2007 |
| CN | 101701912 A | 5/2010 |

(Continued)

OTHER PUBLICATIONS

Li, et al., "Measurement of the refractive index of microquantity liquid filled in a capillary and a capillary wall without destruction," Applied Optics, Optical Society of America, vol. 52, No. 21, Jul. 20, 2013, 10 pages.

(Continued)

*Primary Examiner* — Kara E. Geisel
*Assistant Examiner* — Omar H Nixon
(74) *Attorney, Agent, or Firm* — LaBatt, LLC (57) ABSTRACT

With the method of the invention a wavelength-dependent refractive index of a specimen medium, which is examined with a light microscope, is determined. With the light microscope, a specimen measurement at the specimen medium which has an unknown refractive index is performed, wherein illumination light is radiated to the specimen medium and detection light coming from the specimen medium is measured. With the specimen measurement, a specimen measurement focus position of the illumination and/or detection light is measured. Using a mathematical model, in which a focus position of illumination and/or detection light is defined in dependence of a refractive index (Continued)

of a medium, the refractive index of the specimen medium is derived from the specimen measurement focus position. Furthermore, a light microscope for carrying out the method is described.

17 Claims, 3 Drawing Sheets (51) Int. Cl.
  G02B 21/00    (2006.01)
  G02B 21/24    (2006.01)
  G02B 21/36    (2006.01)
(52) U.S. Cl.
  CPC ......... *G02B 21/244* (2013.01); *G02B 21/365* (2013.01); *G02B 21/367* (2013.01)
(58) Field of Classification Search
  USPC .......................................... 356/128
  See application file for complete search history.

(56) References Cited

U.S. PATENT DOCUMENTS

| | | | |
|---|---|---|---|
| 2004/0233452 A1 | 11/2004 | Prelewitz | |
| 2007/0158568 A1* | 7/2007 | Nakamura | H01J 37/153 250/311 |
| 2007/0231787 A1* | 10/2007 | Voelker | B01L 7/52 435/4 |
| 2015/0032090 A1 | 1/2015 | Gonzalez | |
| 2015/0286042 A1 | 10/2015 | Hilbert et al. | |
| 2016/0170197 A1* | 6/2016 | Kenny | G02B 21/365 348/79 |

FOREIGN PATENT DOCUMENTS

| | | |
|---|---|---|
| CN | 203455276 U | 2/2014 |
| DE | 102011081192 A1 | 2/2013 |
| EP | 3374755 B1 | 12/2019 |

OTHER PUBLICATIONS

Gahm, T., et al., "Measurement of the optical thickness of transparent tissue layers," Journal of Microscopy, vol. 141, No. 1, Jan. 1986, pp. 101-110.

Li, et al., "Measurement of the refractive index of microquantity liquid filled in a capillary and a capillary wall without destruction," Applied Optics, Optical Society of America, vol. 52, No. 21, Jul. 20, 2013, 3 pages—Only an Abstract is available.

Tearney, G.J., et al., "Determination of the refractive index of highly scattering human tissue by optical coherence tomography," Optics Letters, vol. 20, No. 21, Nov. 1, 1995, pp. 2258-2260.

International Application No. PCT/EP2016/074313, Translation of the Written Opinion of the International Searching Authority, dated Feb. 27, 2017, 6 pages.

* cited by examiner

LIGHT MICROSCOPE AND METHOD FOR DETERMINING A WAVELENGTH-DEPENDENT REFRACTIVE INDEX OF A SAMPLE MEDIUM

The present invention relates in a first aspect to a method for determining a wavelength-dependent refractive index of a specimen medium which is examined with a light microscope according to the preamble to claim 1.

In the present disclosure, the term "specimen medium" may refer to the medium, for example a liquid, to which a specimen to be examined is later added. The expression "specimen medium" may, however, also refer to the medium in which the specimen is already added.

In a second aspect, the invention relates to a light microscope according to the preamble to claim 12.

In general, a multitude of different kinds of light microscopes exist for examining specimens. Generally a specimen which is within a specimen medium is illuminated with illumination light and detection light coming from the specimen is detected.

A generic light microscope thus comprises an illumination light source for emitting illumination light in direction of a specimen medium to be examined. Furthermore, a generic light microscope comprises an objective and a camera device for measuring detection light coming from the specimen medium.

Propagation of the illumination light and the detection light in the specimen medium depends substantially on the refractive index of the specimen medium. The refractive index is also referred to as refractive number or index of refraction. The refractive index may also be wavelength-dependent. Usually a light microscope is configured for one certain refractive index or for a distribution/range of refractive indices in which also the refractive index of the deployed cover glass is considered. Light microscopes may also be configured for a wavelength-dependent refractive index, i.e., the optical properties of the light microscope are designed in dependence of the wavelength such that illumination and/or detection light of different wavelengths have a common or similar beam path. In particular, achromatic or apochromatic objectives may be used.

Measurement quality is negatively affected if a specimen medium is used with a refractive index to which the light microscope is not adjusted/configured. For example, the sharpness may be deteriorated as aberrations or color errors may occur in the imaging.

To avoid these problems, specific specimen media with a known wavelength-dependent refractive index are used. However, this may lead to high costs. Furthermore, the refractive index is usually only adjusted for the specimen medium to the desired value before the actual specimen is added to this medium. It is typically not taken into consideration whether the specimen itself has an impact on the refractive index.

Generally it is possible to determine the refractive index of the specimen medium upfront. However, this involves additional efforts with regard to apparatuses and required time for a user. Thus, in practice measurements are very often carried out with light microscopes in which the refractive index of the specimen medium is unknown and deviates from an ideal value at which the best possible image quality would be achieved.

In the following, a case is described in which the above-mentioned problems are particularly relevant. An important group of light microscopes are light sheet fluorescence microscopes. In these microscopes, an illumination beam path is transverse, usually perpendicular, to a detection beam path. To this end, an illumination objective is perpendicular to a detection objective. Alternatively, the illumination beam path and the detection beam path may also run transversely to each other through a single objective. Illumination light is directed into the specimen medium as a sheet/plane. This is referred to as a light sheet. The detection beam path is transverse or perpendicular to the light sheet. In the illuminated plane-like area, fluorophores in the specimen are excited. In this example, the detection light to be detected may thus be fluorescence light. Often, aqueous solutions with a refractive index n close to the refractive index of water, i.e., n=1.33, are used as specimen media. The idealized refractive index of the specimen often lies in a similar order of magnitude. The illumination objective and the detection objective are usually adjusted for this case and produce sharp specimen images. Problems occur, however, if the specimen is, for example, chemically treated/cleared to make it transparent for fluorescence measurements in deep tissue layers. The refractive index n and the wavelength dependency of the refractive index n(lambda), i.e., the dispersion, may thus deviate strongly from the refractive index and dispersion of water. To avoid jumps in the refractive index, usually a specimen medium is thus used which has a refractive index that has been adjusted to the refractive index of the specimen. For example, the specimen medium may directly correspond to a clearing medium used. Detection and illumination objectives are optically adjusted to this. The wavelength-dependent refractive index, however, generally depends strongly on the respective composition/recipe of the specimen medium. In individual manufacture of the specimen medium in the laboratory, the wavelength-dependent refractive index may also vary between batches. This negatively affects both the illumination and the detection beam paths. Some light microscopes comprise Corr rings or other correction means to adjust the light microscope to another refractive index of a specimen medium; however, such measures may only be carried out usefully if the refractive index of the momentarily examined specimen medium is known. This is usually not the case.

It may be regarded an object of the invention to provide a light microscope and a method with which a wavelength-dependent refractive index of a specimen medium can be determined in a particularly easy way.

This object is achieved with the method comprising the features of claim 1 and with the light microscope comprising the features of claim 12.

Advantageous variants of the light microscope of the invention and of the method of the invention are subject-matter of the dependent claims and are also explained in the following description.

The method of the invention for determining a wavelength-dependent refractive index of a specimen medium which is examined with a light microscope comprises:
 performing with the light microscope a specimen measurement at the specimen medium which has an unknown refractive index, wherein for the specimen measurement, illumination light is radiated to the specimen medium and detection light coming from the specimen medium is measured; wherein the detection light is in particular generated by scattering and/or fluorescence in the specimen medium;
 measuring by means of the specimen measurement a focus position (in the following: specimen measurement focus position) of the illumination and/or detection light;

using a mathematical model, in which a focus position of illumination and/or detection light is described/defined in dependence of a refractive index of a medium, for deriving the refractive index of the specimen medium from the specimen measurement focus position.

According to the invention, the light microscope of the above-referenced kind comprises a control and evaluation unit. In the control and evaluation unit, a mathematical model is included in which a focus position of illumination and/or detection light is expressed in dependence of a refractive index of a medium. The control and evaluation unit is configured to determine, for a specimen medium to be examined and with the help of the mathematical model, a refractive index of the specimen medium from a focus position, which is to be input.

As a main idea of the method of the invention, at first a focus position of the illumination and/or detection light is determined. This specimen measurement focus position depends on the refractive index of the specimen medium. Furthermore, this focus position depends on properties of the light microscope, which properties can be previously determined, e.g., through a calibration with a known specimen medium. In this way, knowledge of the specimen measurement focus position allows to directly derive the refractive index of the specimen medium.

Similarly, the control and evaluation unit of the light microscope of the invention may be configured to:
- perform a specimen measurement at a specimen medium with unknown refractive index,
- by means of the specimen measurement, determine a specimen measurement focus position of the illumination light and/or detection light in the specimen medium,
- use the determined specimen measurement focus position as the focus position which is to be input for determining the refractive index of the specimen medium.

The described methods may also be directly used for measurements at a specimen medium which already includes the specimen.

As an important advantage, the light microscope with which the actual specimen examination shall be carried out may thus be used for determining or deriving the refractive index. Separate or additional measurement units are not necessary for this. Rather, the refractive index is directly determined in the specimen area, according to the invention.

Another important advantage may be seen in that the refractive index of the specimen medium may be determined as it is used in the light microscope. The examined medium may thus also include the actual specimen, i.e., the measurement does not need to be carried out during or before the specimen preparation at a time at which the specimen is not yet added to the specimen medium. Alternatively, the refractive index of the specimen medium may also be determined before the specimen is added. In particular, for the determination of the refractive index, the same specimen vessel may be used as for the later measurement with the light microscope. This is advantageous because the specimen vessel itself may have an impact on the refraction. The expression "wavelength-dependent refractive index of the specimen medium" may thus also be understood as the wavelength-dependent refractive index of the combination of the specimen medium and the specimen vessel.

The determined refractive index of the specimen medium may then be output, for example via a screen or a data interface to a user. Alternatively or additionally, in dependence of the determined refractive index of the specimen medium, a certain instruction for actions to change a microscope setting may also be output to a user or to the control and evaluation unit. Possible instructions for actions in dependence of refractive indices may be saved in a storage. The instructions for actions may, for example, refer to an adjustment of zoom optics, of the illumination objective, of the detection objective, replacing the momentarily used specimen vessel or changing an optical component of the light microscope. Alternatively, the control and evaluation unit may also be configured to automatically execute this instruction for actions by itself or automatically. By these actions, a beam path of the illumination and/or detection light may be influenced, thus making it in particular possible to at least partially compensate the effects of a deviation of the refractive index of the examined specimen medium from an ideal refractive index for which the light microscope with the momentarily used components is designed.

In principle, any suitable mathematical model may be used to derive the refractive index from the focus position. For example, the mathematical model may be formed by an equation in which a focus position depends linearly from a refractive index plus a constant. The specimen measurement focus position, which is also referred to as Zmax in the following examples, thus depends on the refractive index $n1$ and a constant which is also referred to as "offset", as follows: $Zmax = c*n1 + offset$. Here, "c" and "offset" are constants which depend on the light microscope, for example depend on a zoom setting or a numerical aperture of a used objective. If the constant c and Offset are known, the refractive index $n1$ for the momentarily used light wavelength(s) may be calculated from the focus position Zmax.

If the specimen measurement is carried out at other wavelengths, the refractive index for these wavelengths can again be calculated in a similar manner.

In general, further expressions may be added to the above-indicated equation, for example an expression with a squared dependence on the refractive index may be added. In principle, in this way more accurate results may be possible, however, further constants that depend on the light microscope must be initially determined. For only few values to be determined, it may be advantageous if according to the equation the calibration measurement focus position is equal to the constant "Offset" plus a linear dependency of the refractive index. For further simplification of the equation, the Offset may also be set to zero, which, however, negatively affects accuracy of the determination of the refractive index.

One or more parameters of this mathematical model, for example the constant c or also the Offset, may be determined through a calibration measurement. These parameters depend on the respective light microscope and in particular on a momentary configuration of the light microscope.

In a preferred embodiment for determining at least one parameter of the mathematical model, at least one calibration measurement is performed with the light microscope in which:
- a medium with known refractive index (instead of the specimen medium with unknown refractive index) is illuminated with illumination light,
- detection light coming from the medium with known refractive index is measured for recording at least one microscope image, and
- with the at least one microscope image, a calibration measurement focus position of the illumination and/or of the detection light is determined (that is, a focus position of the illumination light and/or detection light determined in the calibration measurement).

Using the known refractive index and the determined calibration measurement focus position, it is then possible to calculate at least one parameter of the mathematical model.

In general, with each calibration measurement, one parameter can be calculated. For example, if the above-referenced model Zmax=c*n1+offset is used, then Zmax is measured or determined in one calibration measurement and n1 is known, since a medium with known refractive index n1 is used in the calibration measurement. If also the constant Offset is initially known, for example if it is provided by the microscope manufacturer or determined through another measurement, then it is possible to calculate the constant c with just one calibration measurement.

For determining the constant c and Offset, it is also possible to conduct two (or more) calibration measurements.

If at least two calibration measurements are performed, these measurements differ preferably in one or more of the following ways:
  using different media with a respectively known refractive index;
  using different specimen vessels with geometries that differ from each other in known ways;
  using different microscope settings which influence the calibration measurement focus position.

Different calibration measurements make sense if it is known in which way the factor that differs between the calibration measurements influences the illumination and/or detection beam path. With this knowledge, the influences of this factor on the parameters of the used mathematical model may then be determined, using known optical calculations. For example, different specimen vessels may be used for different calibration measurements, wherein the different specimen vessels refract or influence light differently due to their differing geometry. It is possible to calculate this influence. Therefore, in two calibration measurements with different specimen vessels, the parameter of the models, for example the constant c and/or the Offset, may differ; however, from the parameters of one calibration measurement it is possible to derive the parameters of the other calibration measurement. The same is true if different microscope settings are used, which are described in more detail hereinunder.

In case that the calibration measurements differ in the used media with known refractive index, this has no effect on the parameters of the models, i.e., in the above example, no effect on the constant c and Offset. Rather, two focus positions Zmax1 and Zmax2 for the two refractive indices n1 and n2 of the two media with unknown refractive index may be determined through two measurements. Using the equations $$Zmax1=c*n1+\text{offset and } Zmax2=c*n2+\text{offset}$$

for the first and second calibration measurements, the constant c and Offset may then be calculated.

The different microscope settings, which are used for the at least two calibration measurements, may differ in particular in one or more of the following ways:
  the microscope settings differ in the wavelength of the respectively emitted illumination light;
  the microscope settings differ in the wavelength of the recorded detection light;
  the microscope settings differ in a numerical aperture with which the illumination light is radiated into the medium;
  the microscope settings differ in an illumination direction in which the illumination light is radiated into the medium;
  the microscope settings differ in a zoom setting of a detection optics and thus in particular in an image field size.

Again, it is relevant that it is known for the different microscope settings (for example simulated or calculated through optical calculation techniques), in which way this difference affects the illumination and detection beam paths and thus the focus positions of these measurements.

In general, the expression "calibration measurement" may be understood such that one or more microscope images of a specimen or a medium with known refractive index are recorded. The number of microscope images to be recorded may in particular depend on which focus position is to be determined.

The focus position may refer to a focus of illumination light or detection light.

In the case of detection light, the focus position indicates which plane is imaged sharply onto the deployed camera device. This plane is transverse or perpendicular to the detection beam path, wherein a direction of the detection beam path towards the specimen area is also referred to as z-direction. For determining the focus position, several microscope images may now be recorded, in which a structured medium/a structured specimen is moved to different z-positions. The z-position at which the corresponding microscope image has the highest sharpness, is used as a focus position (in the mathematical models indicated above: Zmax).

In general and in the above-referenced equation, the expression Zmax shall, however, not be seen as limiting the direction in which the focus position is determined. For example, this direction may also be determined in travel direction of the illumination light, which may be transverse to the detection direction and may thus be described as an x-direction. In this case, the focus position is also referred to as Xmax, wherein the description to Zmax similarly applies to Xmas.

The structuring of the medium/specimen is important so that there is any contrast in the microscope image and a sharpness can thus be determined. Therefore, in general any medium may be regarded as a structured medium as long as it leads to a microscope image with brightness variations.

According to the above ideas it may be preferable to record in each calibration measurement several microscope images in which detection optics of the light microscope, in particular a detection objective, images different height planes. For recording images of the different height planes, in principle either a detection objective or a specimen mount may be varied in the height direction. Then, the microscope image of maximal sharpness is determined out of the microscope images. The height plane that corresponds to the microscope image of maximal sharpness is then used as calibration measurement focus position. This method is for example suitable for through-light measurements or fluorescence measurements in reflective light arrangements (i.e., illumination light which passes undeflected is not measured). Furthermore this method is possible when using structured illumination. In this case, the structured illumination may be used instead of the structured specimen or instead of the structured medium, as described in more detail further below.

Determination of the focus position may be carried out for the specimen measurement in a similar manner as for the calibration measurement. In the specimen measurement, several specimen images may be recorded in which detection optics of the light microscope image different height planes. Then the specimen image of maximal sharpness out of the specimen images is determined. The height plane that corresponds to the specimen image of maximal sharpness is then used as specimen measurement focus position.

Determination of a focus position is also possible in an easy way if a structured illumination is used which is radiated onto the specimen transversely, in particular perpendicularly, to the detection beam path. This is in particular the case in the Light Sheet Microscopy or Light Sheet Fluorescence Microscopy. A position of a structured illumination pattern in the specimen area depends on the refractive index of the specimen medium, or on the refractive index of the medium used in a calibration measurement. Therefore, also the position of the structured illumination pattern may be determined and used for the determination of the refractive index. The specimen medium itself thus does not need to comprise a structure producing image contrast. It is sufficient if the illumination light produces a brightness contrast in the specimen. Structured illumination light may in this respect be generally understood to have a focus within the specimen area. For example, a light beam with round cross-section may be used which is focused through the illumination optics into a region in the specimen area, which region may be characterized by, inter alia, its position in the z-direction. Depending on the refractive index of the (specimen) medium, the structuring is differently sharply imaged for different z-positions. By determining for different z-positions the image with maximal sharpness of the structuring, it is possible to derive the calibration measurement focus position analogously to the structured specimen.

Furthermore, in dependence of the refractive index of the (specimen) medium, the position of the focus of the illumination light is influenced. The detection direction is transverse to the illumination direction so that the location of the focus of the illumination light can be determined from a recorded microscope image. In this case, the focus position is not a z-position but a position in travel direction x of the illumination light, i.e., an x-position, wherein the x- and z-directions are transverse or perpendicular to each other. Also more complex structured illuminations, for example a grid-like illumination may be used here.

Considering these thoughts, it may be preferable in the at least one calibration measurement to radiate the illumination light as structured illumination light into the medium with known refractive index and/or to radiate the illumination light as structured illumination light into the specimen medium in the specimen measurement. An illumination beam path is here transverse to a detection beam path and a cross-section of the structured illumination light varies in travel direction of the structured illumination light. The position at which the structured illumination light has the smallest cross-section is used as focus position.

In a preferred embodiment, the structured illumination light is a focused light beam. An illumination beam path of the illumination light may thus be transverse to a detection beam path of the detection light; the illumination light may be focused into the medium with known refractive index and/or into the specimen medium; in the calibration measurement, in at least one microscope image the location is determined at which the illumination light has a minimal cross-section, and this location is used as calibration measurement focus position; and/or in the specimen measurement at least one specimen image is recorded and in this image the location is determined at which the illumination light has a minimal cross-section, and this location is used as specimen measurement focus position.

If at least two calibration measurements are carried out, these calibration measurements may differ from each other at least in the emission of the illumination light in the following way:
for one of the calibration measurements, the calibration measurement focus position of the illumination light is in travel direction in front of an image field center, and
for another of the calibration measurements, the focus of the illumination light is in travel direction behind the image field center.

In this way, the calibration measurements cover a rather large range of possible focus positions so that parameters that are here determined are suitable for deriving a refractive index from the focus position which has been determined in the specimen measurement. The above-referenced image field center may be regarded as the center point of an image which is recorded with the detection optics and the camera device.

In the following, several expressions used in this text are explained for better clarity.

A wavelength-dependent refractive index may be understood such that the refractive index may have different numerical values for different wavelengths.

A specimen measurement refers to an examination of a specimen medium. In contrast thereto, a calibration measurement refers to an examination of another medium. This medium in distinguished from the specimen medium in that its refractive index (and the wavelength dependency of the refractive index) are initially/previously known. The specimen measurement and the calibration measurement may each comprise several image recordings between which for example the specimen position or an illumination or detection setting is varied. In principle, it is only relevant that a focus position of the illumination light or of the detection light in the specimen area (i.e., within or near the specimen medium or within or near the medium with known refractive index) can be determined from the specimen measurement or the calibration measurement.

The detection light may be understood to be light coming from the specimen. Detection light may for example be illumination light that is scattered, reflected or diffracted at the specimen. Alternatively, the detection light may also be or comprise fluorescence or phosphorescence light. Fluorophores, for example so called beads (fluorescent spheres) or so-called fiducials (fix markers), may be added to the specimen medium to allow carrying out a determination of a focus with fluorescence light.

The above-mentioned mathematical model expresses generally a dependency of a focus position on a refractive index of the medium/specimen medium which is here examined. The model may thus comprise an equation which comprises at least the focus position and the refractive index as variables. If a calibration measurement is carried out, the same equation may be used as model whereby a value of a constant of the equation may be determined. This value is then used for the specimen measurement.

The expressions "specimen" and "specimen medium" may be synonyms. Alternatively the expression "specimen medium" may refer to the medium into which the specimen is later added. The latter variant is advantageous for easily determining the propagation and the focus position of structured illumination light in the specimen medium without the specimen itself influencing the position of the focus (which in this case would make analysis harder).

One objective may serve for both directing illumination light to the specimen and directing detection light coming from the specimen. Depending on the microscopy method, two or more different objectives may be used for the illumination light and the detection light which are also referred to in the present disclosure as illumination objective and detection objective. In this case, an objective may also be understood to be either an illumination objective or a detection objective.

A camera device may be any means/unit that is configured to record a spatially resolved image. The camera device may thus for example comprise one or more 1D or 2D CCD or CMOS chips.

The control and evaluation unit of the light microscope may in principle be any kind of calculation means. This may be integrated in or at a light microscope stand or may also be arranged distanced therefrom, for example in a personal computer or a computer connected through network means. The control and evaluation unit may in particular be configured to carry out the embodiments of the invention described here as method variants.

Accordingly, the features of the invention described as additional device features may also be regarded as variants of the method of the invention, and vice versa.

Further advantages and features of the invention are described in the following with reference to the attached schematic figures.

Similar and similarly-acting components are in general indicated in the figures with the same reference signs.

Figure 1:
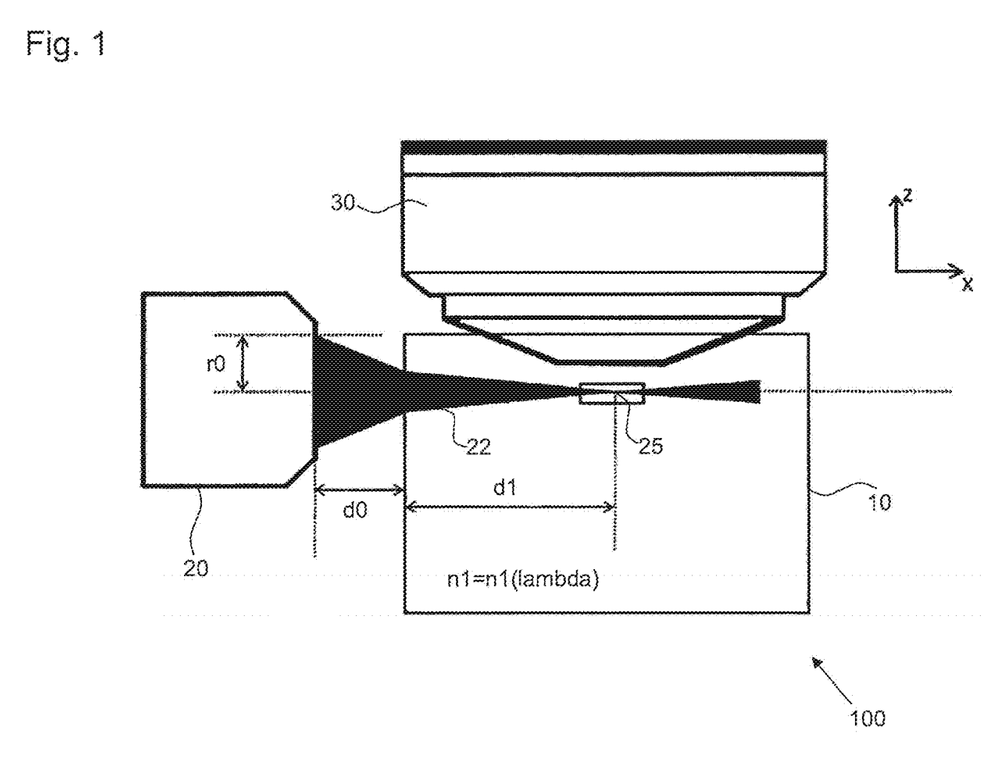
FIG. 1 shows a first exemplary embodiment of a light microscope of the invention.

A first exemplary embodiment of a light microscope 100 of the invention is schematically shown in FIG. 1.

In this example, the light microscope 100 is configured for light sheet microscopy. In this case an illumination beam path, along which illumination light 22 reaches a specimen area, is transverse to a detection beam path along which detection light from the specimen area is detected.

The light microscope 100 thus comprises an illumination objective 20 and a detection objective 30 which is different from the illumination objective 20.

A specimen medium to be examined is located in a specimen chamber 10. As an example, the detection objective 30 is shown to be immersed in the specimen medium in the specimen chamber 10.

Illumination light 22 of an illumination light source (which is not shown here) is radiated via the illumination objective 20 into the specimen medium. The travel direction of the illumination light 22 in the specimen medium is indicated as x-direction. Transverse or perpendicular thereto, detection light is directed in a direction, which is indicated as z-direction, via the objective 30 to a camera device which is not shown here. The detection light may in particular be scattered illumination light or fluorescence light.

The illumination light 22 is refracted at the interface to the specimen medium in dependence of the refractive index of the specimen medium. This is shown at the edge of the specimen chamber 10, at a distance d0 from the illumination objective 20. The illumination objective 20 produces a focus of the illumination light 22 in the specimen medium. This focus position, which is separated by a distance d1 from the edge of the specimen chamber 10, is indicated with the reference sign 25. The focus position 25 depends on the refractive index n1 of the specimen medium.

Focusing the illumination light 22, i.e., decreasing the cross-section of the illumination light 22, is not only carried out in z-direction, as shown in FIG. 1, but also in y-direction, i.e., in a direction perpendicular to the drawing plane. The y-direction is perpendicular to the detection beam path so that a microscope image can be recorded which extends in x- and y-directions. As focus position 25 of the illumination light 22, the position in x-direction may then be determined at which the y-extension of the illumination light 22 is minimal.

The illumination light 22 may have in this example a round or circular cross-section. Other shapes or patterns are, however, also possible as long as a focus can be determined.

For the light sheet microscopy, a cylinder lens may be used by which the illumination light is only focused in z-direction. In y-direction the illumination light extends, however, to form a light sheet or a thin illuminated layer in the specimen medium. For a determination of the focus position to become possible, in such a case the cylinder lens may be removed or replaced for the specimen measurement so that the illumination light 22 is also focused in y-direction.

The x-position of the focus now contains information about the refractive index of the medium: A mathematical model is used in which the focus position 25 of the refractive index n1 depends on the (specimen) medium. In the present example, the focus position 25 is an x-position and may thus also be referred to as Xmax.

As an example, the following equation may be used as the mathematical model:

$$X\text{max} = c * n1 + \text{Offset}$$

Here, c is a constant which is multiplied with the refractive index n1, and Offset is a constant which is added.

As an example, the constant c may be illustrated for the arrangement of FIG. 1 with the help of the Snell's law via the following equation:

$$d1 = [(r0 - NA\ d0)/NA] n1 = c\ n1$$

Here, d1 refers to the distance of the focus position 25 from the edge of the specimen vessel, whereas d0 denotes the distance of the illumination objective 20 to the edge of the specimen vessel. A refractive index n0 applies over the distance d0 and is chosen in the above equation to be n0=1 for air. NA is the illumination aperture and r0 is the radius of the illumination light 22 when exiting the illumination objective 20.

The constant Offset in the above-referenced equation may in particular depend on the location of the image field relative to the camera device.

The two constants c and Offset may be initially known and/or may be determined through calibration measurements as described in more detail further below.

Knowledge of the refractive index n1 is important for image recording with a particularly high quality. In particular if the refractive index is wavelength-dependent, determination of the refractive index is advantageous for the momentarily used wavelength of the illumination light or detection light.

Figure 2:
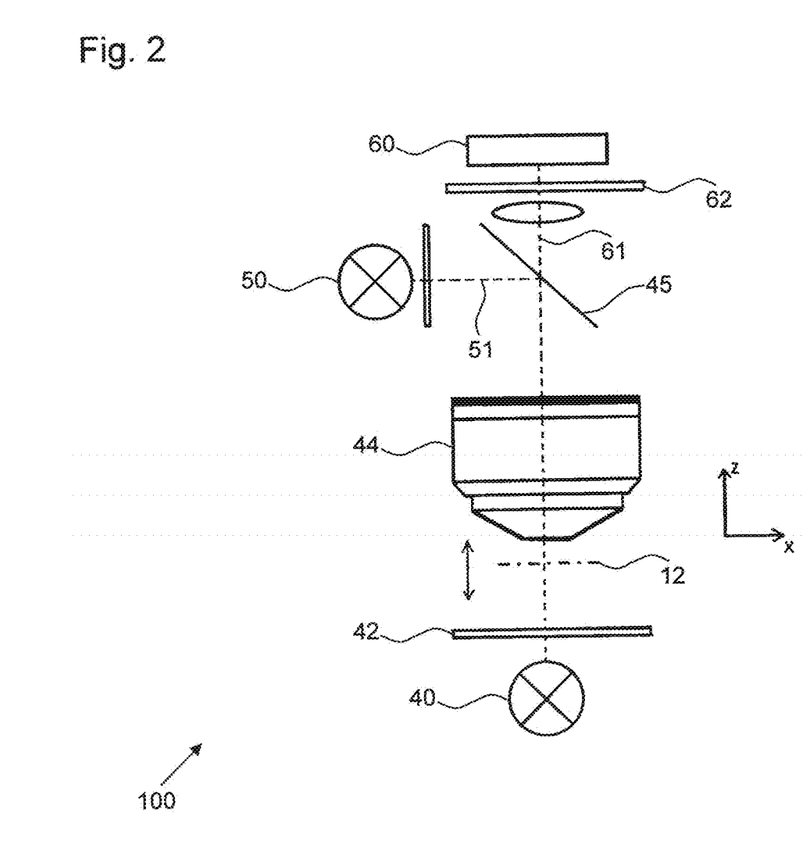
FIG. 2 shows a second exemplary embodiment of a light microscope of the invention.

With reference to FIG. 1, determination of the focus position has been described for a light microscope which is suitable for the light sheet microscopy. The focus position may, however, also be used in differently designed light microscopes. For example, FIG. 2 shows a light microscope 100 which is suitable for reflective-light measurements and/or through-light measurements.

This light microscope 100 comprises an illumination light source 40 for through-light measurements, and an illumination light source 50 for reflective-light measurements. Illumination light of the illumination light source 40 is directed along an illumination beam path 41 via optionally provided filters 42 to a specimen medium 12. Illumination light passing through the specimen, such illumination light being referred to as detection light, is directed along a detection beam path 61 through a detection objective 44 and optional filter 62 to a camera device 60.

Illumination light of the illumination light source 50 is, in contrast, directed in a reflective-light arrangement onto the specimen medium 12. To this end, the illumination light is directed via an optional beam splitter 45 to a beam path which is common with detection light, and is in this way directed through the objective 44 onto the specimen medium 12. The specimen medium 12 may then emit e.g. fluorescence light as detection light. The detection light is then guided through the objective 44 to the camera device 60. The objective 44 thus acts here as detection objective and also as illumination objective.

The specimen medium 12 comprises in this case a structured specimen. A structured specimen may be understood such that the specimen medium 12 does not homogeneously act on illumination light over its cross-section. In this way, an image recorded with the camera device 60 comprises a contrast and allows to determine the image sharpness.

It is now possible to consecutively record images of different height planes of the specimen. The height planes are to be understood as layers/planes which are offset to each other in direction of the detection light. For recording different height planes, the specimen may be moved, for example, or an illumination beam path or detection beam path may be varied such that consecutively different height planes are sharply imaged onto the camera device (i.e., consecutively, different height planes are optically conjugate to an image plane at which the camera device is positioned).

From the images recorded in this way, a focus position can now be determined. For example, the image with maximum sharpness may be chosen from the recorded images. The height plane corresponding to this image is regarded to be the focus position.

As already described with reference to the exemplary embodiment of FIG. 1, the refractive index n1 of the specimen medium may now be derived from the focus position. To this end, the above-referenced equation may be used, wherein the focus position is a z-position in the embodiment of FIG. 2, and is thus referred to as Zmax:

$$Zmax = c*n1 + \text{Offset}$$

Depending on the measurement arrangement, the determined refractive index n1 may refer to the wavelength of the illumination or detection light. If the embodiment of FIG. 2 is used for fluorescence measurements, a focus of the detection light is determined. The refractive index n1 refers in this case to the detection light. In contrast, in the embodiment of FIG. 1, the focus position of the illumination light is determined, and thus the determined refractive index n1 refers to the illumination light. In through-light measurements, the illumination light and detection light may have the same wavelength so that the above differentiation becomes obsolete.

In the embodiment of FIG. 2, a structured specimen is used for determining a sharpness in the recorded images. Alternatively, a structured illumination may also be used. As an example, the structured illumination may, as explained with reference to FIG. 1, be formed by a focused illumination light beam which propagates in x-direction, i.e., transverse or perpendicular to the detection direction. As described with reference to the structured specimen, also this illumination light beam may now be displaced in z-direction, or the detection beam path is adjusted to consecutively measure several height planes. The different height planes are to be understood relative to the illumination light beam. In this way the height plane can be determined in which the illumination light beam is focused. That means, the z-position is determined at which the illumination light beam has the smallest extension in the y-direction. Based on this focus position, the refractive index of the specimen medium can be determined, as described above.

In the following, calibration measurements are described. With the calibration measurements, parameter of the equation can be determined, which parameters are used to derive the refractive index from the measured focus position. In the above-referenced exemplary equation, these parameters are the constant c and Offset.

A calibration measurement differs from a specimen measurement in that one or more microscope images of a medium with known refractive index n1 are recorded. The focus position Zmax or Xmax is then determined from the microscope images. Then, only the parameters c and Offset are unknown and need to be determined. These two parameters may for example be determined with two calibration measurements. Alternatively, one of these parameters may also be determined with a calibration measurement whereas the other parameter is determined in another way (in particular not with the light microscope).

A calibration measurement for the setup of FIG. 1 is described in the following with reference to FIG. 3. This figure shows again illumination light 22 which is focused in the y-direction and radiated through a specimen area, as described with reference to FIG. 1. A detection objective 30 measures again perpendicular thereto, i.e., in z-direction.

Figure 3:
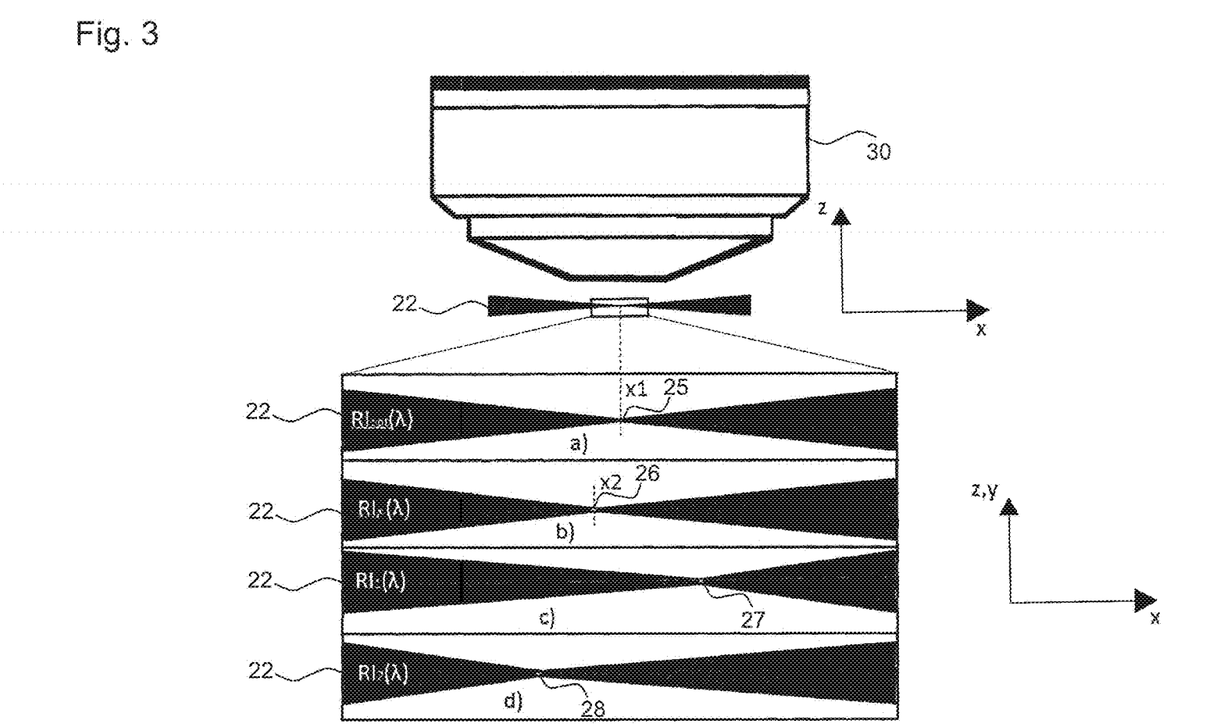
FIG. 3 shows a detail of FIG. 1 with a schematic illustration of illumination beam paths for explaining calibration measurements.

FIG. 3 shows four different cases a) to d) of illumination light 22 which is radiated into the specimen area and through the medium with known refractive index.

Ideally, a focus position 25 of the illumination light, Xmax, should be in the image field center x1 since optical components of the detection beam paths are usually designed for this. Such an ideal case a) is schematically shown in FIG. 3.

It has to be taken into consideration that the varying thickness of the depicted light beam 22 in the cases a) to d) is in particular a y-thickness. The y-extension of the light beam 22 is determined via the detection objective 30.

In a specimen medium, the focus position deviates from the image field center in dependence of the refractive index of the specimen medium. As an example, this is shown in case b) in which a focus position 26 is at a location x2 distanced from x1.

The cases c) and d) show two different calibration measurements. These measurements may differ from each other, for example, in the wavelength of the illumination light. The medium which is arranged in the specimen area for the calibration measurements may have a known refractive index which is wavelength-dependent. Due to this, the two focus positions 27 and 28 differ from each other in the cases c) and d). The two focus positions 27 and 28 each correspond to a value Xmax which belongs to a respective refractive index n1. Using the above-referenced equation Xmax=c*n1+Offset, the two constants c and Offset are now determined. Instead of illumination light of different wavelengths, the calibration measurements may also differ in, for example, different illumination directions or different illumination zoom settings. This also varies the constant c and/or the Offset, however, this change can be calculated so that also in this case the two unknown parameters c and Offset can be determined for a certain illumination direction or illumination zoom setting using two calibration measurements.

Then, a specimen medium with unknown refractive index may be placed in the specimen area. With a determination of the focus position and with the known constants (in particular known through the calibration measurements) of the used mathematical model, the refractive index of the specimen medium can be easily determined. Then, the specimen may be placed in the specimen medium. Alternatively, the specimen may already be added to the specimen medium before determining the focus position.

Knowing the refractive index of the specimen medium, following examinations may be advantageously adjusted, thus increasing the quality of image recording. For example, illumination optics may be moved or an objective may be laterally shifted.

The invention claimed is:

1. A method for determining a wavelength-dependent refractive index of a specimen medium which is examined with a light microscope, the method comprising:
    performing with the light microscope a specimen measurement of the specimen medium which has an unknown refractive index, wherein illumination light is radiated to the specimen medium and detection light coming from the specimen medium is measured;
    measuring a specimen measurement focus position of the illumination or detection light in the specimen medium by means of the specimen measurement;
    using a mathematical model, in which a focus position of illumination or detection light in the specimen medium is defined in dependence of a refractive index of a medium, for deriving the refractive index of the specimen medium from the specimen measurement focus position in the specimen medium.

2. The method as defined in claim 1,
characterized in that the mathematical model is formed by an equation in which a focus position depends linearly from a refractive index plus a constant (Offset).

3. The method as defined in claim 1,
further comprising performing at least one calibration measurement with the light microscope for determining at least one parameter of the mathematical model, wherein in the calibration measurement:
    a medium with known refractive index is illuminated with illumination light,
    detection light coming from the medium with known refractive index is measured for obtaining at least one microscope image, and
    a calibration measurement focus position of the illumination or detection light is determined from the at least one microscope image, and
calculating at least one parameter of the mathematical model based on the known refractive index and the determined calibration measurement focus position.

4. The method as defined in claim 3,
wherein an illumination beam path of the illumination light is transverse to a detection beam path of the detection light,
the illumination light is focusedly radiated into the medium with known refractive index or the specimen medium,
determining during the calibration measurement the location in the at least one microscope image at which location the illumination light has a minimal cross-section, and using that location as calibration measurement focus position, or recording during the specimen measurement at least one specimen image and determining in that image at which location the illumination light has a minimal cross-section, and using this location as specimen measurement focus position.

5. The method as defined in claim 4,
further comprising
performing at least two calibration measurements which differ from each other at least in the emission of the illumination light such that:
    for one of the calibration measurements, the calibration measurement focus position of the illumination light is in travel direction in front of an image field center, and
    for another of the calibration measurements, the calibration measurement focus position of the illumination light is in travel direction behind the image field center.

6. The method as defined in claim 1,
further comprising performing at least two calibration measurements,
wherein the calibration measurements differ from each other in one or more of the following ways:
    using different media with a respectively known refractive index;
    using different specimen vessels with geometries that differ from each other in known ways;
    using different microscope settings which influence the calibration measurement focus position.

7. The method as defined in claim 6,
wherein the different microscope settings which are used for the at least two calibration measurements differ in one or more of the following ways:
    the microscope settings differ in the wavelength of the respectively emitted illumination light;
    the microscope settings differ in the wavelength of the recorded detection light;
    the microscope settings differ in a numerical aperture with which the illumination light is radiated into the medium;
    the microscope settings differ in an illumination direction in which the illumination light is radiated into the medium;
    the microscope settings differ in a zoom setting of detection optics and thus in an image field size.

8. The method as defined in claim 1,
further comprising recording several microscope images in each calibration measurement, wherein for the several microscope images, detection optics of the light microscope image different height planes,
determining the microscope image of maximal sharpness out of the microscope images,
using the height plane that corresponds to the microscope image of maximal sharpness as calibration measurement focus position.

9. The method as defined in claim 1,
further comprising recording in the specimen measurement several specimen images for which detection optics of the light microscope image different height planes,
determining the specimen image of maximal sharpness out of the specimen images,
using the height plane that corresponds to the microscope image of maximal sharpness as specimen measurement focus position.

10. The method as defined in claim 1,
further comprising at least one of:
radiating the illumination light as structured illumination light into the medium with known refractive index during the at least one calibration measurement, or
radiating the illumination light as structured illumination light into the specimen medium during the specimen measurement,
wherein an illumination beam path is transverse to a detection beam path and a cross-section of the structured illumination light varies in the travel direction of the structured illumination light.

11. The method as defined in claim 1,
further comprising
outputting the determined refractive index of the specimen medium or outputting a certain instruction to a user or to a control and evaluation unit for automatic or non-automatic adjustment of a microscope setting, in dependence of the determined refractive index of the specimen medium.

12. A light microscope comprising
an illumination light source for emitting illumination light in direction of a specimen medium to be examined,
a detection objective and a camera device for measuring detection light coming from the specimen medium, and
an illumination objective configured to produce a focus of the illumination light within the specimen medium, wherein the illumination objective and the detection objective are formed by different objectives or one and the same objective,
wherein the light microscope comprises a control and evaluation unit in which a mathematical model is included in which a focus position of illumination or detection light in the specimen medium is expressed in dependence of a refractive index of the specimen medium, and
the control and evaluation unit is configured to determine the focus position of illumination or detection light in the specimen medium and to determine the refractive index of the specimen medium from the focus position of illumination or detection light in the specimen medium, with the help of the mathematical model.

13. The light microscope as defined in claim 12,
wherein the control and evaluation unit is furthermore configured to:
perform a specimen measurement at a specimen medium with unknown refractive index,
determine by means of the specimen measurement a specimen measurement focus position of the illumination or detection light,
use the determined specimen measurement focus position as focus position to be input for determining the refractive index of the specimen medium.

14. A method for determining a wavelength-dependent refractive index of a specimen medium which is examined with a light microscope, the method comprising:
performing with the light microscope a specimen measurement of the specimen medium which has an unknown refractive index, wherein illumination light is radiated to the specimen medium and detection light coming from the specimen medium is measured; wherein an illumination beam path of the illumination light is transverse to a detection beam path of the detection light,
measuring a specimen measurement focus position of the illumination or detection light by means of the specimen measurement;
using a mathematical model, in which a focus position of illumination or detection light is defined in dependence of a refractive index of a medium, for deriving the refractive index of the specimen medium from the specimen measurement focus position.

15. The method as defined in claim 14,
further comprising performing at least one calibration measurement with the light microscope for determining at least one parameter of the mathematical model, wherein the calibration measurement comprises:
focusedly radiating the illumination light into a medium with known refractive index;
measuring detection light coming from the medium with known refractive index for obtaining at least one microscope image; and
determining during the calibration measurement the location in the at least one microscope image at which location the illumination light has a mini-mal cross-section, and using that location as calibration measurement focus position; and
calculating at least one parameter of the mathematical model based on the known refractive index and the determined calibration measurement focus position.

16. The method as defined in claim 15,
further comprising
performing at least two calibration measurements which differ from each other at least in the emission of the illumination light such that:
for one of the calibration measurements, the calibration measurement focus position of the illumination light is in travel direction in front of an image field center, and
for another of the calibration measurements, the calibration measurement focus position of the illumination light is in travel direction behind the image field center.

17. The method as defined in claim 14,
further comprising
focusedly radiating the illumination light into the specimen medium,
recording during the specimen measurement at least one specimen image and determining in that image at which location the illumination light has a minimal cross-section, and using this location as specimen measurement focus position.

* * * * *